United States Patent Office 3,220,385
Patented Nov. 30, 1965

3,220,385
TUBE FURNACE FOR THE INDIRECT HEATING
OF GASES OR LIQUIDS
Jan Sellin, Ave. de l'Europe 74, Monthey,
Schweiz, Switzerland
Filed Feb. 1, 1963, Ser. No. 255,446
9 Claims. (Cl. 122—156)

This invention relates to tube furnaces for the indirect heating of gases or liquids and especially to those furnaces wherein the media passed through the tube system can be subjected to very high working temperatures within relatively short periods of time.

The tube furnaces now generally in use are equipped with simple tubes which are arranged in the fire chamber of the furnace in the form of registers, spirals or bundles. In order to improve the thermal transmission or to accelerate or instigate chemical reactions, it is also already known to equip the tubes with installations, filling bodies or catalysts.

In such tube systems with simple tubes the latter are mostly arranged vertically in the furnace chamber and mounted both at their upper and at their lower ends.

However, even in the case for example of simple tubes of U-shape or similar shape, it is unavoidable that their entry and exit from the furnace chamber must always be arranged at a certain distance from one another, so that in the temperature-dependent expansion and contraction of the tubes, especially in the high temperature range, stresses are produced which are very difficult to master. Thus not only bending and under some circumstances even destruction of the tubes occur, but an especially difficult problem is also the sealing of the tube at the points of entry to and exit from the furnace chamber, since at these points as a result of the variations of length of the tubes caused by temperature, relative movements always take place between the furnace masonry and the tubes.

It has been attempted to reduce the foregoing difficulties by using steels with high nickel alloy content for the tubes, whereby their strength in fact was appreciably increased at high temperatures, but the problems of sealing at the entry and exit of the furnace chamber still were not completely overcome. Apart from a considerable increase of expense, the steels with high nickel alloy also involve the great disadvantage that they substantially reduce the radiation permeability of the tubes, whereby the efficiency of furnaces equipped with such tubes naturally is greatly reduced. Furthermore, due to the admixture of nickel, in many processes a catalytic effect generally in use can start from the nickel components, which may be undesired. In addition nickel-alloy steels in the high temperature range are very sensitive to sulphur or other impurities contained in the flue gas or in the reaction medium, so that one is compelled to use specially purified and expensive fuels.

In order to avoid the thermal stresses caused by temperature and achieve other advantages, counter-current tubes, one within the other, are known from the construction of heat exchangers. Each counter-current tube is here preferably independently detachable mounted on the furnace lid to facilitate withdrawal of the counter-current from the top of the furnace. Due to this construction the tubes can expand freely downwardly and due to the arrangement of the connection flanges of each individual counter-current tube on the common supply and discharge conduits outside the hot zone of the furnace, it is even possible to govern well the stresses caused by temperature occurring at the points of connection.

It has, however, been found that even in the case of furnaces of the type just described that considerable disadvantages occur. Most result from the fact that as a result of the combined effects of the weight of the tubes, the catalytic filling thereof and the tractional stresses caused by the internal pressure of the reaction medium after a time of working, the strength of the tubes is reduced. The reduced strength causes an increase in the gas-permeability of the tube wall at the areas highly subjected to the aforementioned traction stresses. This area is generally located adjacent the point of suspension of the tubes.

Also, in the furnaces of the suspended tube type just described the heating generally takes place from above and the tubes are thus hottest at their connection with the tube wall and are thereat most greatly subjected to traction stresses. Naturally these phenomena can be mitigated or limited at a higher temperature range by the use of high heat resistance steels of the type heretofore noted, such as high nickel alloy steels which possess disadvantages explained above.

The cross-sectional weakening of the suspended tubes is naturally especially serious when the furnace in question is started and stopped relatively frequently by reason of the operational requirements in each case, because by reason of the alternate stressing thereby caused the attenuation of the tube wall is substantially increased at the point most greatly stressed.

It has appeared in practice that the furnaces described above with counter-current tubes suspended freely in the furnace chamber, when tubes of normal steels are used, for the stated reasons can be stressed at most up to about 1,000° C. Even when tubes of superior alloy steel are used, a permanent working temperature of about 1,200° C. could not be appreciably exceeded.

Now for many processes it is greatly desired to be able to operate such furnaces even with substantially higher temperatures, namely, at about 1,400° C., with relatively short times of travel of the reaction media.

In order to achieve this aim, it is now proposed in accordance with the invention, with maintenance of the advantages of the furnace construction described above and with the obtaining of additional advantages, to mount the known counter-current tubes only at their lower ends and to permit them to extend with their upper ends freely into the fire chamber. Thus, the fundamental advantage is achieved that the greater compressive strength of the tube materials, usually present in the high temperature range, can be utilized since the tubes are no longer subjected to traction stress but exclusively to pressure stress. There is, however, also the fact that in the case of tubes filled with catalyst the catalyst filling itself no longer stresses the tube walls and the internal pressure in the counter-current tubes at least partially opposes the pressure stressing of the tubes effected by the inherent weight thereof, instead of causing additional stresses as in the case of the suspended tubes of the known style of furnace.

It is advantageous to produce the tubes from a material which possesses substantially higher compressive strength than traction strength under the operational conditions in each case. As materials especially suitable for this purpose there are considered ceramic or vitreous substances, and of these especially quartz, which with a traction strength of at maximum about 700 kg./sq.cm. possesses a compression strength of about 23,000 kg./sq.cm.

The use of tubes consisting for example of quartz also brings the considerable advantage that they permit the passage of ultra-violet and many other radiation proportions absorbed by steel, which by reason of their known catalytic effects favorably influence the reaction progressing in the interior of the tube and can also reduce the energy consumption. The use of such materials for the counter-current tubes was not fundamentally possible in the case of the furnace construction known hitherto with suspended tubes, on account of their low traction strength at relatively high temperatures.

The better utilization of the radiation energy and the increase of the thermal transmission involved therewith further permits of shortening the time of travel of the reaction media, which helps to prevent extremely undesired subsidiary reactions in the case of a great number of processes which are under consideration. More especially, however, the possibility of rapid heating of the reaction medium in many cases is also very advantageous, for example in order to avoid the occurrence of carbon deposits before the actual intensively heated reaction chamber, which may be filled with catalyst.

The upright arrangement of the counter-current tubes according to the invention incidentally brings the further advantage that at the upper points of deflection the danger of tube blockages as a result of the deposits of soot formation, catalyst dust or the like, such as frequently are established at the lower points of deflection of the known freely suspended counter-current tubes, is avoided, since such deposits at the upper points of deflection are constantly opposed by gravity.

Due to the fact that the connections to the individual counter-current tubes according to the invention can be arranged beneath the furnace, a furnace constructed in accordance with the invention is especially suitable for erection in the open air, since these connection points are thus well protected from the outset against the influence of weather. Furthermore, replacement of the individual counter-current tube units also no longer necessitates the provision of a crane above the furnace, so that when the furnaces are set up within closed buildings the latter can be made correspondingly lower, if an appropriate trench is provided beneath the furnace for the withdrawal of the individual counter-current tubes.

Furthermore it has proved very favorable that the furnace top can be made especially stable and sealed, since as a result of the tube arrangement in accordance with the invention it can be kept completely free of tube passages and possibly also of burners, and thus leakage points which normally effect an undesired chimney effect as a result of the natural thermal rise within the furnace are easier to avoid.

It is here especially advantageous to arrange between the main fire chamber and the flue gas chimney, shortly before the securing ends of the counter-current tubes, a refractory partition with such openings that between each counter-current tube and the partition there is an annular gap for the passage of the flue gases to the chimney. The heating gases are thereby compelled to take their path concentrically around each individual counter-current tube nuit, washing uniformly around these from all sides, whereby the intensity of the thermal transmission is further improved.

It is further possible to distribute the counter-current tubes approximately uniformly over the entire furnace cross-section and to provide before the free ends of the counter-current tubes a free flame chamber heated in cyclone fashion by burners which open inwardly approximately tangentially. In connection with the concentric flue gas withdrawal achieved by the arrangement of the partition in the vicinity of the securing ends of the counter-current tubes, around every individual counter-current tube, the placing of such a fire chamber before the free ends of the counter-current tubes effects an extraordinarily uniform heating of each individual counter-current tube, since due to the cyclone-type heating of the fire chamber placed before the free ends a very uniform flame zone establishes itself therein and the heating gases therefore wash around the free ends of the tubes very uniformly on all sides, as far as their securing ends.

The features of the heating gas conduction last explained can naturally fundamentally also be utilized in the case of furnaces with suspended counter-current tubes of the construction style already known, but this conduction is especially advantageous in connection with furnaces with upright tubes according to the present invention, because here the fire chamber can be arranged above the free ends of the counter-current tubes and a spraying of the tube walls with fuel droplets is here most extensively avoided, this occurring substantially more easily in the case of firing from beneath and causing extraordinarily unpleasant corrosion phenomena on the tubes. Furthermore, in the case of firing from above downwards any ash particles which are formed from the fuel are carried away substantially better with the flue gases than in the case of heating gas current directed from below upwards.

The end surfaces of the upright tubes used in accordance with the invention, which are especially exposed to fuel splashes and ash deposits in the case of heating taking place from above, can be protected against this by the application of caps which are preferably made easily interchangeable, which furthermore at the same time also can receive a shaping which guides the heating gases. If appropriate refractory materials are used for these protective elements, they can at the same time fulfill heat-blocking functions at the upper ends of the tubes which are most greatly exposed to the thermal radiation.

Figure 1:
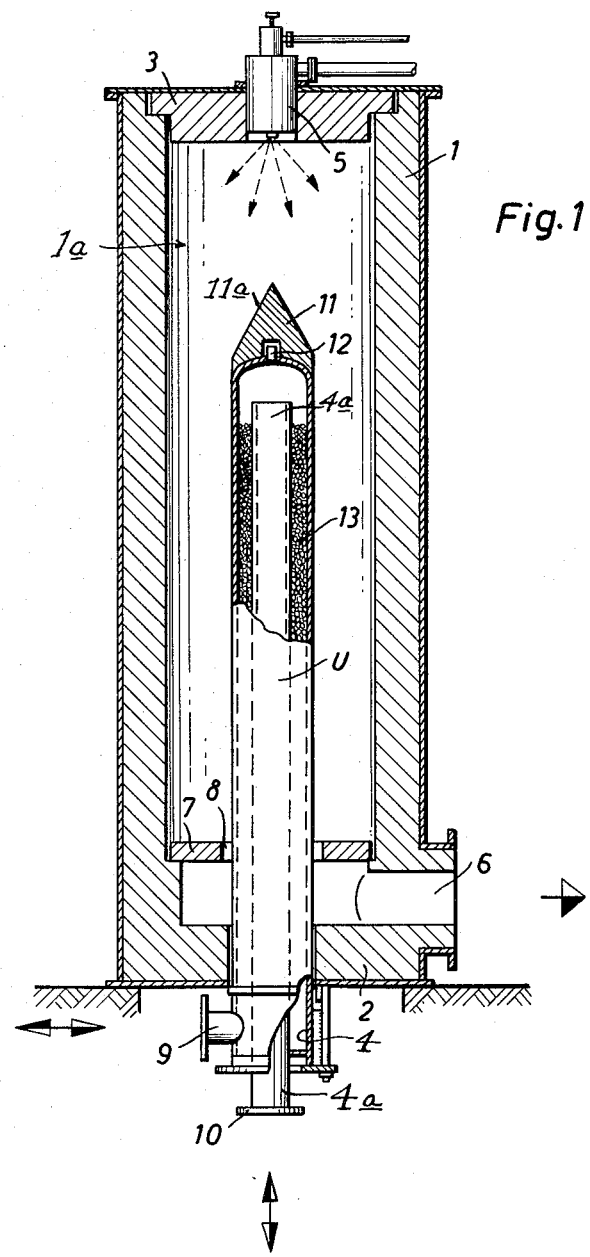
FIG. 1 is a vertical sectional view of one embodiment of the tube furnace with only one standing counter-current tube partly shown in section.

Referring more in detail to the accompanying drawings and as illustrated in FIG. 1, there is shown a tube furnace including a single counter-current tube, the vertical wall 1 of the furnace rising from the bottom wall 2 and with a furnace tube wall 3 being produced of the usual refractory material. A counter-current tube unit U is inserted from beneath and through a central opening in the bottom wall 2 of the furnace and is secured in this manner in any convenient way with its upper end spaced some distance from the top wall 3 of the furnace.

The heating of the furnace is effected by means of a burner 5 arranged centrally of the top wall 3 and the flue gases are withdrawn through an extraction outlet 6 adjacent the bottom wall 2 of the furnace.

Between the actual fire chamber 1a of the furnace and the flue gas extraction outlet 6, and in proximity of the lower end of an outer counter-current tube 4 and above the extraction outlet 6, there is arranged a refractory partition 7 with a central annular opening 8 that spaces the partition 7 from the counter-current tube unit 4. Exteriorly of the furnace chamber 1a there are provided connections 9 and 10 respectively for the outer counter-current tube 4 and an inner tube 4a comprising the unit U. Depending upon the process in each case, the reaction medium fed to the counter-current tube unit U can be supplied through the inner pipe 4a and removed through the outer pipe 4, or vice versa, supplied through the outer pipe 4 and removed through the inner pipe 4a. In the counter-current tube unit U, a catalytic filling 13 can be provided both in the inner tube and in the annual space between the latter and the outer tube. For example, in the case of the form of the embodiment of FIG. 1, such a filling 13 is provided only in the annular space between the inner tube 4a and the outer tube or pipe 4.

Upon the upper end of the outer counter-current tube 4 as illustrated in FIG. 1, there is placed a protective cap 11 of refractory material that is mounted on the upper end of the tube and has a bore or socket 11a to receive the pin or peg 12 connected to and rising centrally from the upper end of the tube 4. This cap protects the tube unit U both against excessive terminal radiation and against sprinkling with fuel droplets or against ash deposits from the burner 5.

Figure 2:
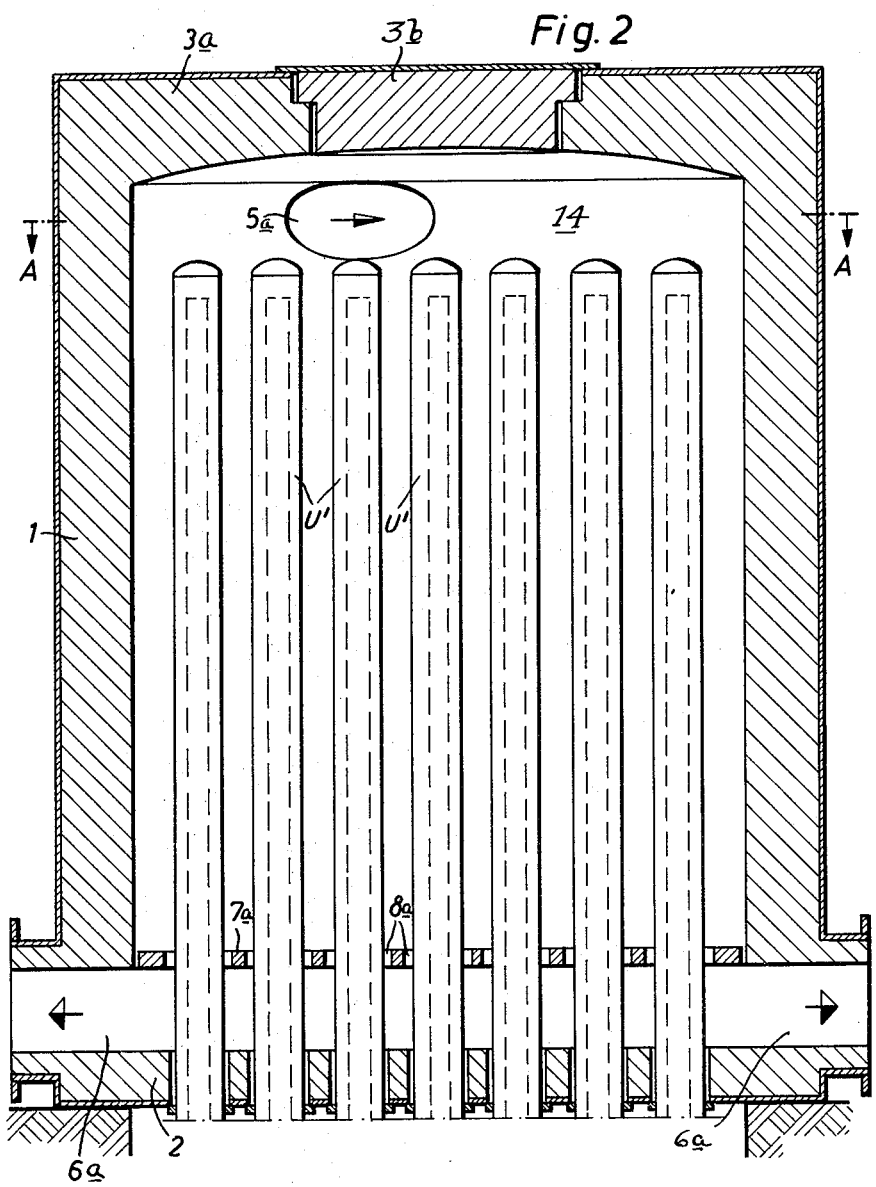
FIG. 2 is a vertical sectional view of another form of furnace with a plurality of counter-current tubes distributed over the entire furnace cross-section.
Figure 3:
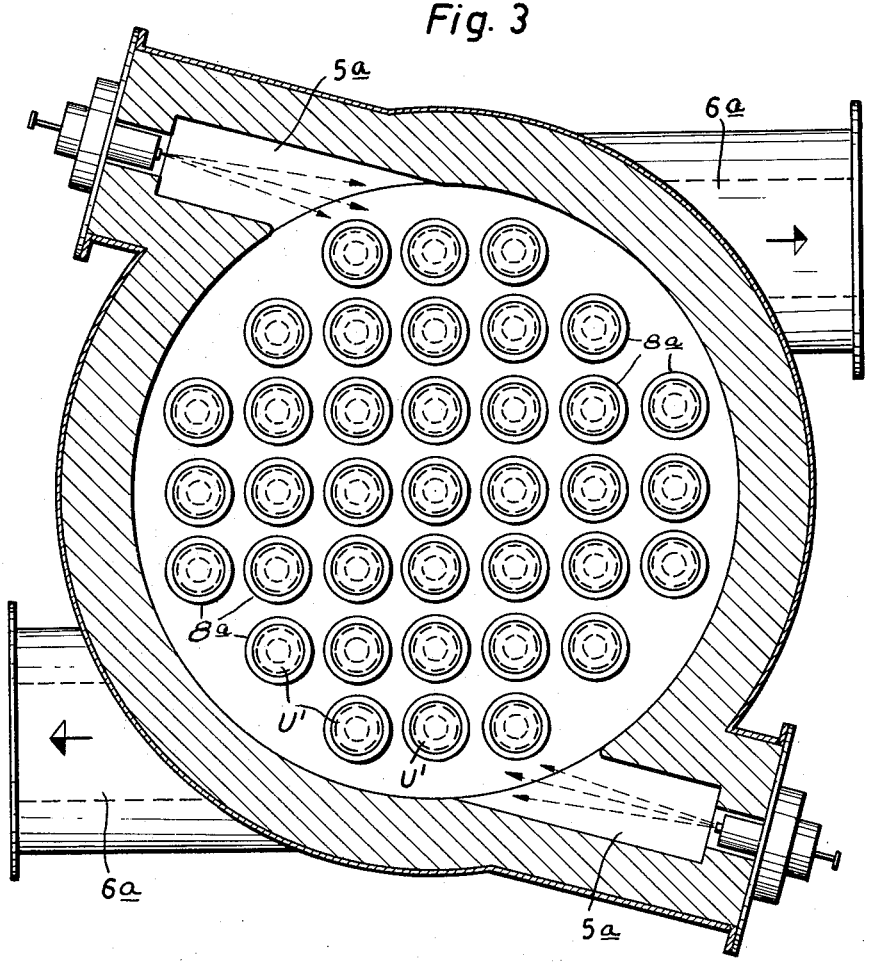
FIG. 3 is a cross-sectional view taken on line A—A of FIG. 2.

The furnace construction according to FIGS. 2 and 3 corresponds substantially to that form of invention illustrated in FIG. 1 except that there is a plurality of counter-current tube units U' distributed uniformly over the entire cross-sectional area of the furnace and above the upper free ends of these counter-current tube units U' there is provided a fire chamber 14 heated in cyclone fashion by tangentially entering burners 5a. The partition 7a arranged shortly above the lower ends of the counter-current tubes U' between the actual fire chamber and the two flue gas extraction pipes 6a that are provided in tangential arrangement with the extraction openings in such fashion that between each individual counter-current tube unit and the partition 7a, there is an annular gap or opening 8a for the extraction of the flue and heating gases. Due ot the cyclone type of heating at the fire chamber 14, the latter is fired uniformly and the heating gases flow around the individual counter-current units uniformly over their entire length, as emphasized above.

In the case of relatively slender counter-current tube units it will be expedient to arrange in the vicinity of the upper ends of the tubes a transverse grid, similar to the grid 7a with its space opening into the retaining element of which, adapted to size and distribution of the counter-current tubes, the counter-current tubes can be inserted freely with their free ends upwardly from beneath, in order to avoid lateral inclination of the tubes.

As may be seen in FIG. 2, the furnace top wall 3a is completely free of any passages so that it can be sealed in an especially simple fashion and thus the greatly undesired chimney effects which occur in the case of leakages can be avoided.

An explosion guard lid or cover 3b is arranged in the middle of the furnace top 3a which lid in the case of an explosion would be projected upwardly whereby danger to the operating personnel would be avoided.

Due to the lateral tangential arrangement of the burners, they are rendered more accessible through the furnace top for repair or replacement. The connections of the counter-current tube units U and U' are also more accessible than in the case of furnaces of this generally known type and, furthermore, such connections lie beneath the furnace and are well protected against weather conditions.

While there are herein shown and described the preferred embodiments of the invention, it is nevertheless to be understood that minor changes may be made therein without departing from the spirit and scope of the invention as claimed.

What is claimed is:

1. A tube furnace for the indirect heating of gases and liquids comprising an apertured base, a top wall and a tubular wall forming a fire chamber between the apertured base and the top wall, at least one counter-current tube unit extending from below the apertured base, through the apertured base and terminating below the upper extremity of the fire chamber, support means below the apertured base for supporting the portion of the counter-current tube unit within the fire chamber in unrestrained relation to allow uninhibited expansion and contraction of said tube unit in response to fire chamber temperature changes, said counter current tube unit comprising an inner and outer tube disposed in coaxial, spaced telescoped relation, said support means including means removably mounting said inner and outer tube independently of each other on said furnace below said apertured base, said furnace including burner means communicating with the upper end of said fire chamber, said furnace including an outlet portion in the lower portion of said furnace for causing heated gases to flow from said fire chamber downwardly through said outlet portion.

2. A tube furnace as in claim 1, wherein the counter-current tubes comprise material possessing greater compression strength than traction strength under the same operational conditions in each case.

3. A tube furnace as in claim 1, wherein the counter-current tubes comprise material possessing greater compression strength than traction strength under the same operational conditions in each case, the counter-current tubes being formed of a quartz-like material.

4. The structure as claimed in claim 1 in which said furnace includes a transversely disposed partition plate having an aperture through which said tube unit projects, said aperture in said partition plate permitting heating gases to flow therethrough from said fire chamber to said outlet portion.

5. The structure as claimed in claim 1 including a plurality of said counter-current tube units each independently mounted on said furnace in spaced relation from said first mentioned tube unit, each of said tube units being of like construction.

6. The structure as claimed in claim 1 in which said burner means is located in an upper portion of the fire chamber and includes a portion directed downwardly onto the upper end of said tube unit.

7. The structure as claimed in claim 1 in which said burner means is directed tangentially into the upper end of said fire chamber, and said outlet portion opens tangentially into said furnace for providing a cyclone-flow through said fire chamber about said tube unit.

8. The structure as claimed in claim 1 in which said tube unit includes a protective cap removably mounted on the upper end thereof.

9. The structure as claimed in claim 5 in which said burner means is directed tangentially into the upper end of said fire chamber, and said outlet portion opens tangentially into said furnace for providing a cyclone-flow through said fire chamber about said tube unit.

References Cited by the Examiner

UNITED STATES PATENTS

| | | | |
|---|---|---|---|
| 2,134,058 | 10/1938 | Ris | 165—142 |
| 2,280,089 | 4/1942 | Houdry | 165—142 X |
| 2,401,848 | 6/1946 | Wallace | 122—181 |
| 2,645,566 | 7/1953 | Stookey | 23—277 |
| 2,652,037 | 9/1953 | Lewis et al. | 122—510 |
| 2,654,657 | 10/1953 | Reed | 23—277 |
| 2,783,354 | 2/1957 | Loebel et al. | 165—142 |
| 3,119,671 | 1/1964 | Koniewiez et al. | 23—288 |

FREDERICK L. MATTESON, JR., *Primary Examiner.*

KENNETH W. SPRAGUE, *Examiner.*